(12) United States Patent
Chican et al.

(10) Patent No.: US 12,000,692 B2
(45) Date of Patent: Jun. 4, 2024

(54) THREE-DIMENSIONAL IMAGING AND SENSING USING A DYNAMIC VISION SENSOR AND PATTERN PROJECTION

(71) Applicant: PROPHESEE, Paris (FR)

(72) Inventors: Guillaume Chican, Villemomble (FR); Manuele Brambilla, Paris (FR); Xavier Lagorce, Saint-Maur-des-Fosses (FR)

(73) Assignee: Prophesee, Paris (FR)

( * ) Notice: Subject to any disclaimer, the term of this patent is extended or adjusted under 35 U.S.C. 154(b) by 298 days.

(21) Appl. No.: 17/310,753

(22) PCT Filed: Feb. 21, 2020

(86) PCT No.: PCT/EP2020/054688
§ 371 (c)(1),
(2) Date: Aug. 20, 2021

(87) PCT Pub. No.: WO2020/169835
PCT Pub. Date: Aug. 27, 2020

(65) Prior Publication Data
US 2022/0120560 A1 Apr. 21, 2022

Related U.S. Application Data

(60) Provisional application No. 62/810,926, filed on Feb. 26, 2019, provisional application No. 62/809,557, filed on Feb. 22, 2019.

(51) Int. Cl.
*G06T 15/00* (2011.01)
*G01B 11/25* (2006.01)
(Continued)

(52) U.S. Cl.
CPC .......... *G01B 11/2513* (2013.01); *G06F 18/23* (2023.01); *G06T 7/521* (2017.01);
(Continued)

(58) Field of Classification Search
CPC .... G06F 18/23; G06V 10/762; G06V 10/145; G06V 2201/12; G06V 10/60; G06V 20/64;
(Continued)

(56) References Cited

U.S. PATENT DOCUMENTS 9,952,323 B2 * 4/2018 Deane ................... G01S 7/4817
2015/0285625 A1 10/2015 Deane
2022/0120560 A1 * 4/2022 Chican ................... G06F 18/23

FOREIGN PATENT DOCUMENTS

CN 106091984 B 1/2019

OTHER PUBLICATIONS

U.S. Appl. No. 17/310,755, filed Aug. 20, 2021, titled Three-Dimensional Imaging and Sensing Using a Dynamic Vision Sensor and Pattern Projection.
(Continued)

*Primary Examiner* — Phu K Nguyen
(74) *Attorney, Agent, or Firm* — Finnegan, Henderson, Farabow, Garrett & Dunner, LLP

(57) ABSTRACT

The present disclosure generally relates to systems and methods for three-dimensional image sensing. More specifically, and without limitation, this disclosure relates to systems and methods for detecting three-dimensional images, and using asynchronous image sensors for detecting the same. In one implementation, at least one processor determines a plurality of patterns associated with a plurality of electromagnetic pulses emitted by a projector onto a scene; receives, from an image sensor, one or more first signals based on reflections caused by the plurality of electromagnetic pulses; detects one or more first events corresponding to one or more first pixels of the image sensor based on the received signals; based on the one or more first events, initializes one or more first events more state machines; receives, from the image sensor, one or more second signals
(Continued)

corresponding to the reflections; detects one or more second events corresponding to one or more second pixels of the image sensor based on the received signals; determines candidates for connecting the one or more state machines more second events to the one or more first events; and determines three-dimensional points for the one or more first pixels and the one or more second pixels based on the candidates and the one or more state machines.

26 Claims, 10 Drawing Sheets

(51) Int. Cl.
| | | |
|---|---|---|
| *G06F 18/23* | (2023.01) | |
| *G06T 7/521* | (2017.01) | |
| *G06V 10/145* | (2022.01) | |
| *G06V 10/60* | (2022.01) | |
| *G06V 10/762* | (2022.01) | |
| *G06V 20/64* | (2022.01) | |

(52) U.S. Cl.
CPC ............ *G06V 10/145* (2022.01); *G06V 10/60* (2022.01); *G06V 10/762* (2022.01); *G06V 20/64* (2022.01); *G06T 2207/10016* (2013.01)

(58) Field of Classification Search
CPC ................ G01B 11/2513; G06T 7/521; G06T 2207/10016; G06T 2207/10152
USPC .......................................................... 345/418
See application file for complete search history.

(56) References Cited

OTHER PUBLICATIONS

International Search Report and Written Opinion of International Application PCT/EP2020/054685, mailed date Apr. 20, 2020.
Christian Brandli et al., "Adaptive pulsed laser line extraction for terrain reconstruction using a dynamic vision sensor", Frontiers in Neuroscience, vol. 7, Jan. 17, 2014, pp. 1-9.
T. Leroux et al., "Event-based Structured Light for Depth Reconstruction using Frequency Tagged Light Patterns", ARIXIV.org, Cornell University Library, Cornell University, Nov. 27, 2018.
International Search Report and Written Opinion of corresponding International Application PCT/EP2020/054688, mailed date Aug. 27, 2020.

\* cited by examiner

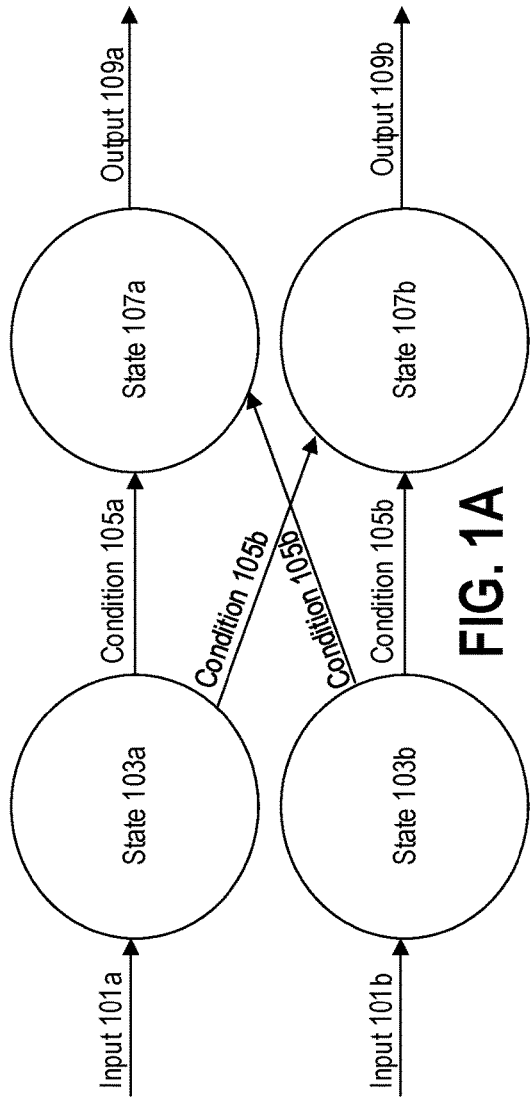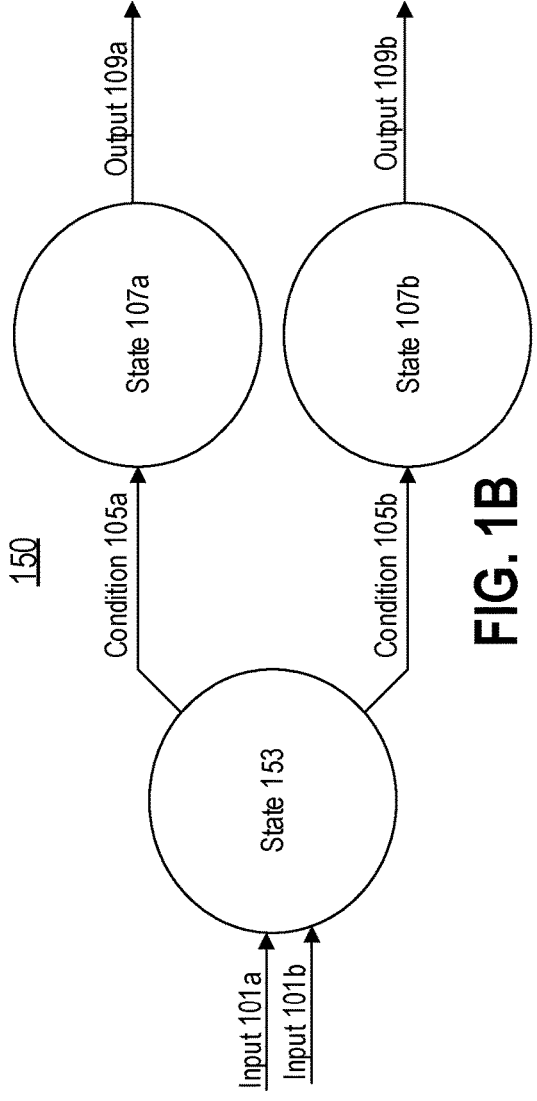

THREE-DIMENSIONAL IMAGING AND SENSING USING A DYNAMIC VISION SENSOR AND PATTERN PROJECTION

RELATED APPLICATIONS

The present application is a U.S. national stage entry under 35 U.S.C. § 371 of International Application No. PCT/EP2020/054688, filed on Feb. 21, 2020, which claims the priority of U.S. Provisional Application No. 62/809,557, filed on Feb. 22, 2019, and U.S. Provisional Application No. 62/810,926, filed on Feb. 26, 2019. The above applications are expressly incorporated into the present disclosure by reference to their entireties.

TECHNICAL FIELD

The present disclosure relates generally to the field of image sensing and processing. More specifically, and without limitation, this disclosure relates to computer-implemented systems and methods for three-dimensional imaging and sensing. The disclosure additionally relates to implementing and using event-based image sensors for three-dimensional image sensing. The image sensors and techniques disclosed herein may be used in various applications and vision systems, such as security systems, autonomous vehicles, and other systems that benefit from rapid and efficient three-dimensional sensing and detection.

BACKGROUND

Extant three-dimensional image sensors include those that produce depth maps of scenes. Such sensors have drawbacks including low spatial or temporal resolution. Extant sensors for three-dimensional image sensing also suffer from other drawbacks, such as being too computationally expensive and/or having other processing limitations.

For example, time-of-flight cameras generally measure depth directly. In such cameras, a modulated signal is emitted using a laser projector, and the distance is estimated by measuring the time shift between the emitted signal and its reflection from objects in the observed scene. Depending on the implementations, time-of-flight systems usually generate up to 60 depth images per second. However, most time-of-flight cameras have low spatial resolutions (e.g., 100,000 pixels or lower). Moreover, the use of a laser projector does not allow for time-of-flight cameras to be used in low-power applications while retaining a high range and a high spatial resolution.

Stereo cameras are based on the idea that it is possible to match points from one view to points in another view. Using the relative position of the two cameras, stereo cameras estimate the three-dimensional position of these points in space. However, stereo cameras typically have limited image density, as only detected points from textured environments can be measured. Moreover, stereo cameras are computationally expensive, therefore suffering from low temporal resolution as well as being limited in use for low-power applications.

Structured light cameras function similarly to stereo cameras but use a pattern projector in lieu of a second camera. By defining the projected pattern, a structured light camera may perform triangulation without using a second camera. Structured light solutions usually have higher spatial resolutions (e.g., up to 300,000 pixels). However, structure light cameras are computationally expensive, therefore generally suffering from low temporal resolution (e.g., around 30 fps). Temporal resolution may be increased but at the expense of spatial resolution. Similar to time-of-flight cameras, structured light cameras are limited in use (e.g., limited in range and spatial resolution) for low-power applications.

Active stereo image sensors combine passive stereo and structured light techniques. In particular, a projector projects a pattern, which may be recognized by two cameras. Matching the pattern in both images allows estimation of depth at matching points by triangulation. Active stereo usually can revert to passive stereo in situations where the pattern cannot be decoded easily, such as an outdoor environment, in a long-range mode, or the like. As a result, active stereo, like structured light techniques and stereo techniques, suffer from low temporal resolution as well as being limited in use for low-power applications.

Recently, structured light systems integrating an event-based camera have been proposed. In these systems, a laser beam projects a single blinking dot at a given frequency. Cameras may then detect the change of contrast caused by the blinking dot; and event-based cameras can detect such changes with a very high temporal accuracy. Detecting the changes of contrast at the given frequency of the laser allows the system to discriminate events produced by the blinking dot from other events in the scene. In some implementations, the projected dot is detected by two cameras, and the depth at the point corresponding to the blinking dot is reconstructed using triangulation.

However, these proposed event-based implementations do not achieve both high spatial and high temporal resolutions. By only projecting one dot at a time at a random position in the image, the temporal resolution directly decreases with the number of used dot locations.

Moreover, even if a system was implemented to project a plurality of dots simultaneously, it would be necessary that the scene remain static until the entire temporal code has been decoded. Therefore, this approach cannot be used to reconstruct dynamic scenes like conventional techniques.

SUMMARY

Embodiments of the present disclosure provide computer-implemented systems and methods that address the aforementioned drawbacks. In this disclosure, systems and methods for three-dimensional image sensing are provided that are both computationally efficient as well as compatible with dynamic scenes. Thus, the generated data may include depth information, allowing for a three-dimensional reconstruction of a scene, e.g., as a point cloud. Additionally, embodiments of the present disclosure may be used in low-power applications, such as augmented reality, robotics, or the like, while still providing data of comparable, or even higher, quality than other higher-power solutions.

Embodiments of the present disclosure may project patterns of electromagnetic pulses and receive reflections of those patterns at an image sensor. The patterns may be indexed to spatial coordinates of the projector, and the image sensor may index the received reflections by location(s) of the pixel(s) receiving the reflections. Accordingly, embodiments of the present disclosure may triangulate depths based on the spatial coordinates of the projector and the pixel(s).

To account for dynamic scenes, embodiments of the present disclosure may use state machines to track received patterns that move across pixels of the image sensor. Thus, a depth may be calculated even if different pixels receive different portions of a pattern. Accordingly, embodiments of the present discourse may solve technical problems presented by extant technologies, as explained above.

Embodiments of the present disclosure may also provide for higher temporal resolution than extant technologies. For example, latency is kept low by using triangulation of known patterns (for example, stored patterns and/or patterns provided from a projector of the patterns to a processor performing the triangulation) rather than matching points in captured images. Moreover, the use of state machines improves accuracy above conventional technologies such as time-of-flight without sacrificing this low latency.

The temporal resolution may be further increased by using an event-based image sensor. Such a sensor may capture events in a scene based on changes in illuminations at certain pixels exceeding a threshold. Asynchronous sensors can detect patterns projected into the scene while reducing the amount of data generated. Accordingly, the temporal resolution may be increased.

Moreover, the reduction in data due to the use of event-based image sensors as described above may allow for increasing the rate of light sampling at each pixel, e.g., from 30 times per second or 60 times per second (which are frame-rates of typical CMOS image sensors) to higher rates such as 1,000 times per second, 10,000 times per second and more. The higher rate of light sampling increases the accuracy of the pattern detection compared with extant techniques.

In one embodiment, a system for detecting three-dimensional images may comprise a projector configured to project a plurality of electromagnetic pulses onto a scene; an image sensor comprising a plurality of pixels and configured to detect reflections in the scene caused by the projected plurality of electromagnetic pulses; and at least one processor. The at least one processor may be configured to: determine a plurality of patterns associated with the plurality of electromagnetic pulses; receive one or more first signals from the image sensor based on the detected reflections; detect one or more first events corresponding to one or more first pixels of the image sensor based on the received first signals; based on the one or more first events, initialize one or more state machines; receive one or more second signals from the image sensor based on the detected reflections; detect one or more second events corresponding to one or more second pixels of the image sensor based on the received second signals; determine candidates for connecting the one or more second events to the one or more first events, and determine three-dimensional image points for the one or more first pixels and the one or more second pixels based on the candidates and the one or more state machines.

In such embodiments, the one or more first events may correspond to a start of the plurality of patterns associated with the plurality of electromagnetic pulses. Moreover, the one or more second events may correspond to an end of the plurality of patterns associated with the plurality of electromagnetic pulses.

In any of these embodiments, the plurality of patterns may comprise at least two different amplitudes separated in time. Additionally, or alternatively, the plurality of patterns may comprise at least two different wavelengths separated in time. Additionally, or alternatively, the plurality of patterns may comprise at least two different pulse lengths separated by a length of time. Additionally, or alternatively, the plurality of patterns comprise a plurality of pulses separated by different lengths of time. In any of these embodiments, the plurality of patterns may comprise pulses having at least one of selected frequencies, phase shifts, or duty cycles used to encode symbols.

In any of these embodiments, the projector may be configured to project the plurality of electromagnetic pulses to a plurality of spatial locations in the scene. Moreover, at least one of the spatial locations may correspond to at least one of the one or more first pixels, and at least one other of the spatial locations may correspond to at least one of the one or more second pixels.

In any of these embodiments, the projector may be configured to project the plurality of electromagnetic pulses at a plurality of different projection times. Moreover, at least one of the projection times may correspond to at least one of the one or more first events, and at least one other of the projection times may correspond to at least one of the one or more second events.

In any of these embodiments, each pixel of the image sensor may comprise a detector that is electrically connected to at least one first photosensitive element and configured to generate a trigger signal when an analog signal proportional to brightness of light impinging on the at least one first photosensitive element matches a condition, and at least one second photosensitive element configured to output a signal that is a function of brightness of light impinging on the at least one second photosensitive element in response to the trigger signal. In such embodiments, the one or more first signals may have positive polarity when the condition is an increasing condition and negative polarity when the condition is a decreasing condition. Accordingly, the at least one processor may be further configured to decode polarities of the one or more first signals to obtain the one or more first events or the one or more second events. Additionally, or alternatively, the at least one processor may be further configured to discard any of the one or more first signals that are separated by an amount of time larger than a threshold and/or to discard any of the one or more first signals associated with a bandwidth not within a predetermined range.

In any of these embodiments, the at least one first photosensitive element may comprise the at least one second photosensitive element. Alternatively, the at least one photosensitive element and the at least one second photosensitive element may be, at least in part, distinct elements.

In any of these embodiments, the system may further comprise an optical filter configured to block any reflections associated with a wavelength not within a predetermined range.

In any of these embodiments, the plurality of patterns may comprise a set of unique symbols encoded in electromagnetic pulses. Alternatively, the plurality of patterns may comprise a set of quasi-unique symbols encoded in electromagnetic pulses. For example, the symbols may be unique within a geometrically defined space. In such embodiments, the geometrically defined space may comprise an epipolar line of the system.

In any of these embodiments, the at least one processor may be further configured to stored finalized state machines comprising the one or more initialized state machines and the candidates. Accordingly, the at least one processor may be further configured to use the stored state machines in determining candidates for subsequent events.

In any of these embodiments, to determine candidates for connecting the one or more second events to the one or more first events, the at least one processor may be further configured to use the plurality of patterns and the one or more state machines.

In one embodiment, an imaging system may comprise a plurality of pixels and at least one processor. Each pixel may comprise a first photosensitive element, a detector that is electrically connected to the first photosensitive element and configured to generate a trigger signal when an analog signal proportional to brightness of light impinging on the first photosensitive element matches a condition, and one or more second photosensitive elements configured to output a signal that is a function of brightness of light impinging on the one or more second photosensitive elements. The at least one processor may be configured to determine a plurality of patterns associated with a plurality of electromagnetic pulses projected onto a scene; receive one or more first signals from the one or more second photosensitive elements based on detected reflections from the scene and in response to trigger signals from the detector; detect one or more first events corresponding to one or more first pixels of the plurality of pixels based on the received first signals; based on the one or more first events, initialize one or more state machines; receive one or more second signals from the one or more second photosensitive elements based on detected reflections from the scene and in response to trigger signals from the detector; detect one or more second events corresponding to one or more second pixels of the plurality of pixels based on the received second signals; determine candidates for connecting the one or more second events to the one or more first events, and determine three-dimensional image points for the one or more first pixels and the one or more second pixels based on the candidates and the one or more state machines.

In such embodiments, to determine the plurality of patterns the at least one processor may be further configured to receive digital signals defining amplitudes separated by time intervals. For example, the digital signals defining amplitudes separated by time intervals may be received from a controller associated with a projector configured to project a plurality of electromagnetic pulses according to the plurality of patterns. Additionally, or alternatively, the digital signals defining amplitudes separated by time intervals may be retrieved from at least one non-transitory memory storing patterns.

In one embodiment, a method for detecting three-dimensional images may comprise determining a plurality of patterns corresponding to a plurality of electromagnetic pulses emitted by a projector onto a scene; receiving, from an image sensor, one or more first signals based on reflections caused by the plurality of electromagnetic pulses; detecting one or more first events corresponding to one or more first pixels of the image sensor based on the received first signals; based on the one or more first events, initializing one or more state machines; receiving, from the image sensor, one or more second signals based on the reflections; detecting one or more second events corresponding to one or more second pixels of the image sensor based on the received second signals; determining candidates for connecting the one or more second events to the one or more first events; and determining three-dimensional image points for the one or more first pixels and the one or more second pixels based on the candidates and the one or more state machines.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate various embodiments and, together with the description, serve to explain the principles and features of the disclosed embodiments. In the drawings:

FIG. 1A is a schematic representation of an exemplary Moore state machine, according to embodiments of the present disclosure.

FIG. 1B is a schematic representation of an exemplary Mealy state machine, according to embodiments of the present disclosure.

DETAILED DESCRIPTION

Figure 2A:
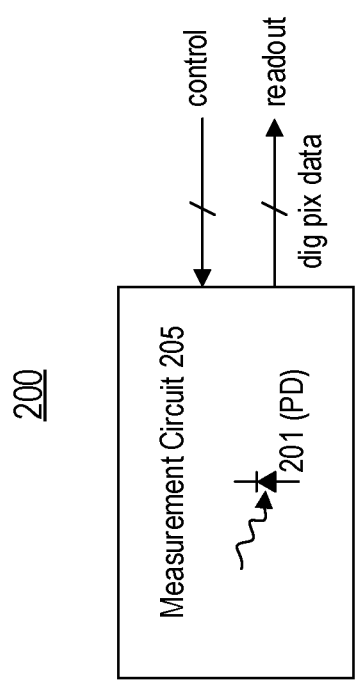
FIG. 2A is a schematic representation of an exemplary image sensor, according to embodiments of the present disclosure.

The disclosed embodiments relate to systems and methods for capturing three-dimensional images, and using asynchronous image sensors for three-dimensional imaging. Advantageously, the exemplary embodiments can provide fast and efficient three-dimensional image sensing. Embodiments of the present disclosure may be implemented and used in various applications and vision systems, such as autonomous vehicles, robotics, augmented reality, and other systems that benefit from rapid and efficient three-dimensional image detection.

Although embodiments of the present disclosure are described with general reference to an imaging sensor, it will be appreciated that such a system may part of a camera, a LIDAR, or other imaging system. Moreover, although some embodiments are described in combination with a projector (such as a laser projector), it will be appreciated that such components may be separate from the image sensors and/or processors described herein.

Embodiments of the present disclosure may use state machines to track reflections across one or more pixels of an image sensor. These state machines may describe the transformation of projected light patterns into the tracked reflections and thus allow for recreation of any dynamic portions of a scene as well as static portions.

As used herein, a "pattern" may refer to any combination of light pulses according to one or more characteristics. For example, a pattern may comprise at least two different amplitudes separated by a length of time, at least two different wavelengths separated by a length of time, at least two different pulse lengths separated by a length of time, a plurality of pulses separated by different lengths of time, or the like. Moreover, a pattern may have at least one of frequencies, phase shifts, or duty cycles used to encode symbols (e.g., as explained below with respect to FIG. 7). Accordingly, a "pattern" need not be regular but instead may comprise an irregular combination of pulses forming a pattern.

FIG. 1A is a schematic representation of an exemplary Moore state machine 100, consistent with embodiments of the present disclosure. In the example of FIG. 1A, one or more states (e.g., states 103a and 103b) may transform to different states (e.g., states 107a and 107b) depending on whether the input (e.g., inputs 101a and 101b) satisfy certain conditions (e.g., conditions 105a and 105b). Further states may test output from previous states against new conditions or may generate different outputs (e.g., outputs 109a and 109b).

FIG. 1B is a schematic representation of an exemplary Mealy state machine 150, consistent with embodiments of the present disclosure. Mealy state machine 150 of FIG. 1B is equivalent to Moore state machine 100 of FIG. 1A. Mealy state machine 150, unlike Moore state machine 100, may change states directly based on input to a state. Accordingly, states 103a and 103b of FIG. 1A may be replaced with state 153 of FIG. 1B.

State machines, such as those depicted in FIGS. 1A and 1B, may be used to describe any condition-based transformation of one state to another. Accordingly, embodiments of the present disclosure may search for state machines that transform a projected pattern of light into one or more states of an image sensor caused by a reflection from the projected pattern of light. These state machines thus connect different portions of a reflection across pixels in order to reconstruct (and decode) the projected pattern. Thus, embodiments of the present disclosure may identify the projected patterns even if there are physical dynamics in a scene (e.g., transversal movement by one or more objects in the scene, rotational movement by one or more objects in the scene, increases in illumination or reflectivity of one or more objects in the scene, or the like).

FIG. 2A is a schematic representation of an image sensor pixel 200 for use in a three-dimensional imaging system, consistent with embodiments of the present disclosure. Pixel 200 may be one of a plurality of pixels in an array (e.g., a square, a circle, or any other regular or irregular shape formed by the arrayed pixels).

Figure 2B:
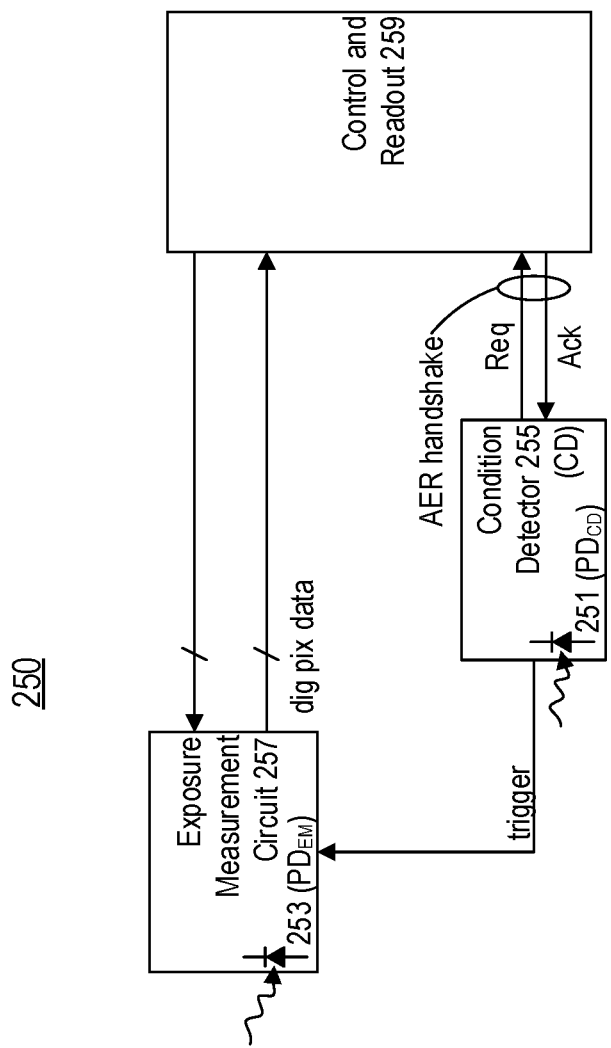
FIG. 2B is a schematic representation of an exemplary asynchronous image sensor, according to embodiments of the present disclosure.

As used herein, a "pixel" refers to a smallest element of an image sensor that outputs data based on light impinging on the pixel. In some embodiments, a pixel may be larger or include more components than a conventional "pixel" because it may include two or more photosensitive elements, other circuitry, or the like, e.g., as depicted in FIG. 2B, described below.

Although the present disclosure refers to a reflection caused by a projected pattern as being received at a single pixel, the projected pattern may include a sufficient number of photons in order to cover and be received by a plurality of pixels. Accordingly, the triangulation described herein may be based on an average location of the plurality of pixels and/or comprise a plurality of triangulations including the locations of each pixel in the plurality.

As depicted in FIG. 2A, a photosensitive element 201 may generate an electrical signal (e.g., a voltage, a current, or the like) based on brightness of light impinging on element 201. As used herein, a photosensitive element may comprise a photodiode (e.g., a p-n junction or PIN structure) or any other element configured to convert light into an electrical signal. A photodiode may generate a current (e.g., $I_{ph}$) proportional to the intensity of light impinging on the photodiode.

As further depicted in FIG. 2A, a measurement circuit 205 may convert the current from element 201 to an analog signal for readout. Measurement circuit 205 may activate in response to an external control signal (e.g., an external clock cycle). Additionally, or alternatively, measurement circuit 205 may convert the signal from element 201 to an analog signal that is stored (e.g., in an on-chip and/or off-chip memory (not shown) accessed by pixel 200) until an external control signal is received. In response to the external control signal, measurement circuit 205 may transmit the stored analog signal (the "dig pix data" in FIG. 2A) to a readout system.

Although not depicted in FIG. 2A, an image sensor using pixel 200 may include row and column arbiters or other timing circuitry such that the array of pixels are triggered according to clock cycles, as explained above. Moreover, the timing circuitry may manage transfer of analog signals to the readout system, as described above, such that collisions are avoided. The readout system may convert the analog signals from the pixel array to digital signals for use in three-dimensional imaging.

FIG. 2B is a schematic representation of an image sensor pixel 250 for use in a three-dimensional imaging system. Pixel 250 may be one of a plurality of pixels in an array (e.g., a square, a circle, or any other regular or irregular shape formed by the arrayed pixels).

As depicted in FIG. 2B, a photosensitive element 251 may generate an electrical signal based on brightness of light impinging on element 251. Pixel 250 may further include a condition detector 255 (CD). As shown in the example of FIG. 2B, detector 255 is electrically connected to the photosensitive element 251 ($PD_{CD}$) and is configured to generate a trigger signal (labeled "trigger" in the example of FIG. 2B) when an analog signal proportional to brightness of light impinging on the photosensitive element 251 matches a condition. For example, the condition may comprise whether the analog signal exceeds a threshold (e.g., a voltage or current level). The analog signal may comprise a voltage signal or a current signal.

As further depicted in FIG. 2B, a photosensitive element 253 may generate an electrical signal based on brightness of light impinging on element 253. Pixel 250 may further include an exposure measurement circuit 257. As shown in the example of FIG. 2B, exposure measurement circuit 257 may be configured to generate a measurement that is a function of brightness of light impinging on the photosensitive element 253 ($PD_{EM}$). Exposure measurement circuit 257 may generate the measurement in response to the trigger signal, as shown in FIG. 2B. Although depicted as using exposure measurement circuit 257 in FIG. 2B, some embodiments may read the measurement from the photosensitive element 253 directly (e.g., using control and readout 259) and omit exposure measurement circuit 257.

In some embodiments, exposure measurement circuit may include an analog-to-digital converter. Examples of such embodiments are disclosed in U.S. Provisional Patent Application No. 62/690,948, filed on Jun. 27, 2018, and titled "Image Sensor with a Plurality of Super-Pixels"; and U.S. Provisional Patent Application No. 62/780,913, filed on Dec. 17, 2018, and titled "Image Sensor with a Plurality of Super-Pixels." The disclosures of these application are fully incorporated herein by reference. In such embodiments, exposure measurement circuit 257 may reset the detector 255 (e.g., using a "clear" signal not shown in FIG. 2B) when the measurement is completed and/or transmitted to an external readout system.

In some embodiments, exposure measurement circuit 257 may output the measurement asynchronously to a readout and control system 259, e.g., using an asynchronous event readout (AER) communications protocol. In other embodiments, readout from exposure measurement circuit 257 may be clocked using external control signals (e.g., labeled "control" in FIG. 2B). Moreover, as depicted in FIG. 2B, in some embodiments, triggers from detector 259 may also be output readout and control system 259, e.g., using an asynchronous event readout (AER) communications protocol.

Examples of pixel 250 depicted in FIG. 2B are disclosed in U.S. Pat. No. 8,780,240 and in U.S. Pat. No. 9,967,479. These patents are incorporated herein by reference.

Although depicted as different photosensitive elements, in some embodiments, photosensitive elements 251 and 253 may comprise a single element shared between the detector 255 and the exposure measurement circuit 257. Examples of such embodiments are disclosed in European Patent Application No. 18170201.0, filed on Apr. 30, 2018, and titled "Systems and Methods for Asynchronous, Time-Based Image Sensing." The disclosure of this application is incorporated herein by reference.

Moreover, although depicted with one detector and one exposure measurement circuit, some embodiments may include a plurality of exposure measurement circuits sharing a detector, such that a trigger signal causes a plurality of measurements to be captured. Examples of such embodiments are disclosed in U.S. Provisional Patent Application No. 62/690,948, filed on Jun. 27, 2018, and titled "Image Sensor with a Plurality of Super-Pixels"; and U.S. Provisional Patent Application No. 62/780,913, filed on Dec. 17, 2018, and titled "Image Sensor with a Plurality of Super-Pixels. The disclosures of these applications are incorporated herein by reference.

Although not depicted in FIG. 2B, an image sensor using pixel 250 may include row and column lines or other readout circuitry such that events generated by pixel 250 may be read off the image sensor, as explained above. Moreover, the timing circuitry may manage transfer of analog signals to the readout system, as described above, such that collisions are avoided. The readout system may convert the analog signals from the pixel array to digital signals for use in three-dimensional imaging.

Figure 3:
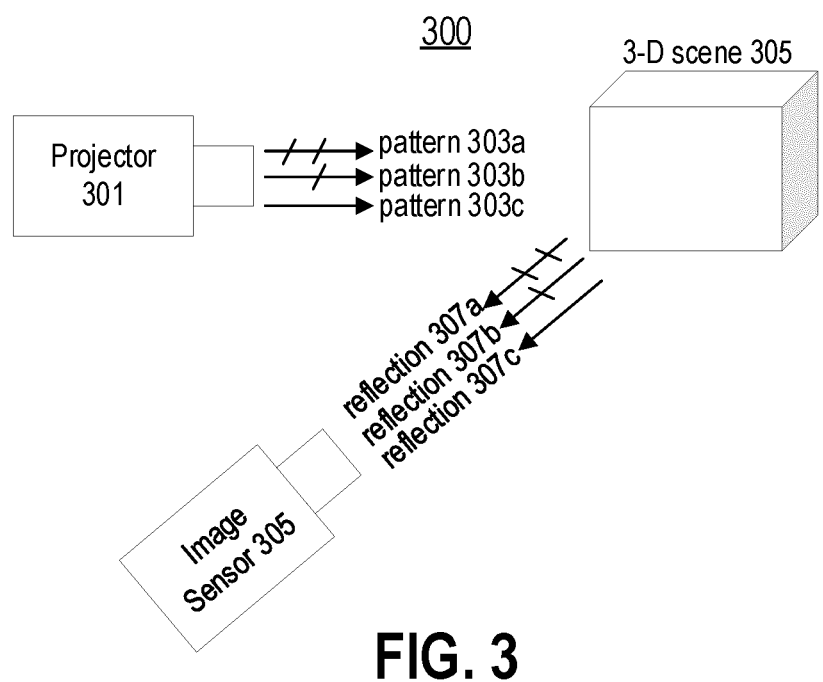
FIG. 3 is a schematic representation of a system using a pattern projector with an image sensor, according to embodiments of the present disclosure.

FIG. 3 is a schematic representation of a system 300 for three-dimensional imaging. As shown in FIG. 3, a projector 301 may transmit electromagnetic pulses according to one or more patterns (e.g., patterns 303a, 303b, and 303c in FIG. 3). Although depicted as using three patterns, any number of patterns may be used. Because each pattern may correspond to a small portion of a three-dimensional scene 305, a high number (e.g., thousands or even hundreds of thousands) of patterns may be used.

Projector 301 may comprise one or more laser generators or any other device configured to project electromagnetic pulses according to one or more patterns. In some embodiments, projector 301 may be a dot projector. Although not depicted in FIG. 3, projector 301 may comprise a controller configured to receive commands or to retrieve stored patterns governing generation and projection of pulses into scene 305.

In some embodiments, projector 301 may be configured to project a plurality of electromagnetic pulses to a plurality of spatial locations in scene 305. The spatial locations may correspond to different pixels of an image sensor 305, further described below. In some embodiments, projector 301 may be configured to project the plurality of electromagnetic pulses at a plurality of different projection times.

In some embodiments, projector 301 may be configured to project a plurality of frequencies, e.g., in order to increase variety within patterns. In other embodiments, projector 301 may be configured to use a single frequency (or range of frequencies), e.g., in order to distinguish reflections caused by the patterns from noise in scene 305. For example, the frequencies may be between 50 Hz and a few kHz (e.g., 1 kHz, 2 kHz, 3 kHz, or the like).

As further depicted in FIG. 3, the projected pulses may cause reflections from scene 305. In the example of FIG. 3, patterns 303a, 303b, and 303c caused reflections 307a, 307b, and 307c, respectively. Although shown as constant in time, the reflections may change angle over time due to dynamics in scene 305. These dynamics may be reconstructed using state machine searches, as explained further below.

The reflections may be captured by an image sensor 305. In some embodiments, image sensor 305 may be an event-based sensor. As explained above, image sensor 305 may comprise an array of pixels 200 of FIG. 2A, an array of pixels 250 of FIG. 2B, or an array of any other pixels, coupled with a readout system. The signals generated by image sensor 305 may be processed as explained below in order to recreate any dynamics in scene 305 and calculate three-dimensional image points for scene 305.

Figure 4:
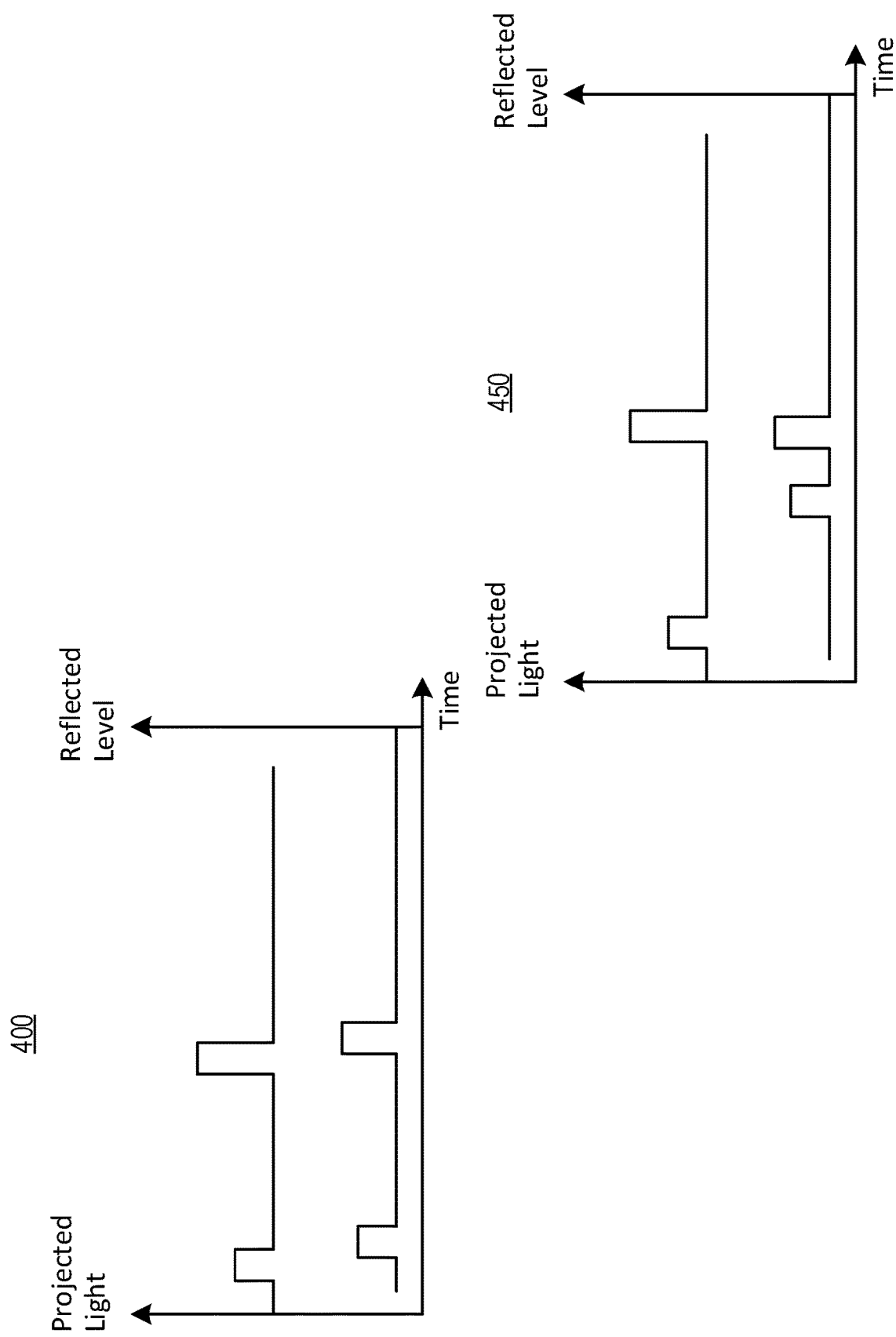
FIG. 4 is a schematic representation of electromagnetic patterns transformed by state machines, according to embodiments of the present disclosure.

FIG. 4 is a schematic representation of electromagnetic patterns transformed by state machines. As explained above, state machines may describe any temporal distortions of an electromagnetic pattern or any spatial distortions of the same. The temporal distortions may, for example, inhibit decoding of a symbol encoded in characteristics of the pattern. The spatial distortions may, for example, spread the symbol across a plurality of pixels of an image sensor receiving the patterns.

FIG. 4 depicts two examples of patterns that are transformed to different temporal patterns according to state machines. For example, state machine 400 transforms the depicted pattern by delaying it. In another example, state machine 450 transforms the depicted pattern by moving the pulses closer in time. These state machines may describe distortions between projection and reflection that may otherwise inhibit proper decoding of the pattern. In another example, state machine 450 transforms the depicted pattern by moving the pulses closer in time.

Although not shown in FIG. 4, state machines may additionally or alternatively transform patterns across space such that different portions of the pattern are received at different pixels of an image sensor (e.g., image sensor 305). Accordingly, any detected patterns may be mapped back to projected patterns using one or more state machines, whether calculated using at least one processor, searching a database of known state machines, or the like.

Figure 5:
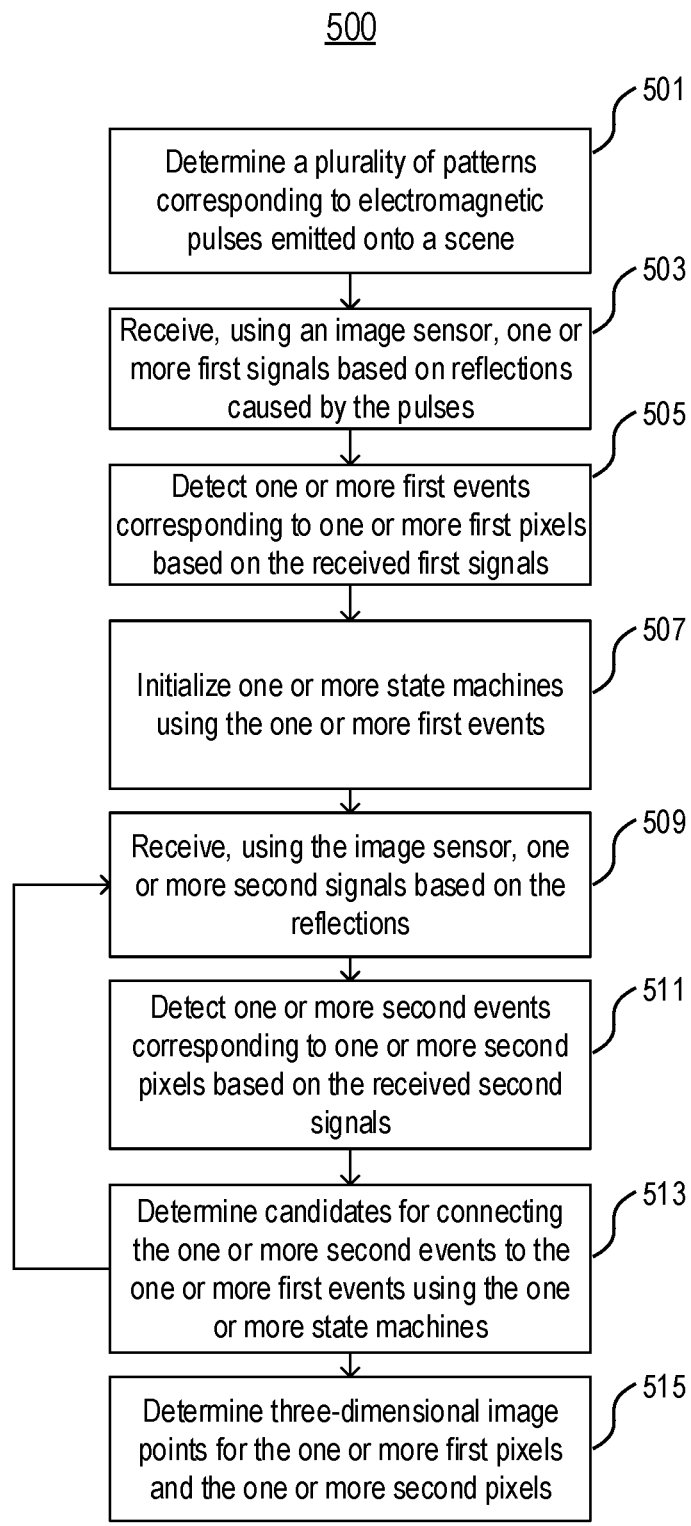
FIG. 5 is a flowchart of an exemplary method for detecting three-dimensional images, according to embodiments of the present disclosure.

FIG. 5 is a flowchart of an exemplary method 500 for detecting three-dimensional images, consistent with embodiments of the present disclosure. Method 500 of FIG. 5 may be performed using at least one processor, whether integrated as a microprocessor on the same chip as an image sensor (e.g., image sensor 200 of FIG. 2A, image sensor 250 of FIG. 2B, or the like) or provided separate as part of a processing system. The at least one processor may be in electrical communication with the projector and image sensor for purposes of sending and receiving signals, as further disclosed herein.

At step 501, the at least one processor may determine a plurality of patterns corresponding to a plurality of electromagnetic pulses emitted by a projector (e.g., projector 301 of FIG. 3) onto a scene (e.g., scene 305 of FIG. 3). For example, as explained above, determining the plurality of patterns may comprise receiving digital signals (e.g., using an on-chip bus connected to at least one transmitter configured to communicate over at least one network, to at least one memory, or the like) defining amplitudes separated by time intervals. In such embodiments, the digital signals defining amplitudes separated by time intervals may be received from a controller associated with a projector configured to project a plurality of electromagnetic pulses according to the plurality of patterns. Additionally, or alternatively, the digital signals defining amplitudes separated by time intervals may be retrieved from at least one non-transitory memory storing patterns.

In some embodiments, the at least one processor may also send commands to the projector configured to project a plurality of electromagnetic pulses onto a scene such that the projector transmits the plurality of electromagnetic pulses according to the patterns. For example, the at least one processor may use an on-chip bus, a wire or other off-chip bus, at least one transmitter configured to communicate over at least one bus, wire, or network, or any combination thereof to send commands to the projector.

As further explained above, the patterns may refer to any series of pulses of electromagnetic radiation over a period of time. For example, a pattern may define one or more pulses by amplitude and/or length of time along the period of time of the pattern. Accordingly, the plurality of patterns may comprise at least two different amplitudes separated by a length of time, at least two different wavelengths separated by a length of time, at least two different pulse lengths separated by a length of time, a plurality of pulses separated by different lengths of time, or the like. Moreover, as described above, the pattern may have at least one of selected frequencies, phase shifts, or duty cycles used to encode symbols (see, e.g., the explanation below with respect to FIG. 7).

At step 503, the at least one processor may receive, from an image sensor, one or more first signals based on reflections caused by the plurality of electromagnetic pulses. For example, as explained above, measurement circuit 205 may convert a signal from photosensitive element 201 into an analog signal proportional to brightness of light impinging on photosensitive element 201. The at least one processor may receive analog signals from measurement circuit 205 as the one or more first signals or may receive digital signals based on the analog signals from an analog-to-digital converter in communication with measurement circuit 205. Additionally or alternatively, as explained above, condition detector 255 (CD) may generate a trigger signal (e.g., "set" in the example of FIG. 2B) when a first analog signal based on light impinging on photosensitive element 251 exceeds a predetermined threshold, and exposure measurement circuit 257 may convert a signal from photosensitive element 253 into a second analog signal proportional to brightness of light impinging on photosensitive element 253 in response to the trigger signal. The at least one processor may receive second analog signals from exposure measurement circuit 257 as the one or more first signals or may receive digital signals based on the second analog signals from an analog-to-digital converter in communication with (or forming a portion of) exposure measurement circuit 257.

At step 505, the at least one processor may detect one or more first events corresponding to one or more first pixels of the image sensor based on the received first signals. For example, as explained above, an event may be detected based on a polarity change between two signals of the one or more first signals, changes in amplitude between two signals of the one or more first signals having magnitudes greater than one or more thresholds, or the like. As used herein, a "polarity change" may refer to a change in amplitude, either increasing or decreasing, detected in the one or more first signals. In embodiments using an event-based image sensor such as image sensor 250 of FIG. 2B, the one or more first signals may themselves encode the one or more first events. Accordingly, the at least one processor may detect the one or more first events by distinguishing the one or more first signals.

In some embodiments, the at least one processor may associate the one or more first events with the one or more first pixels based on addresses encoded with the one or more first signals by the image sensor. For example, the image sensor (or a readout system in communication with the image sensor) may encode an address of the pixel(s) from which the one or more first signals originated. Accordingly, the at least one processor may associate the one or more first events with the one or more first pixels based on addresses encoded with the one or more first signals. In such embodiments, the at least one processor is adapted to decode and obtain the address from the one or more first signals.

At step 507, based on the one or more first events, the at least one processor may initialize one or more state machines. For example, as explained below with respect to FIG. 6, the initialization may include identifying portions of the plurality of patterns corresponding to expected reflections that caused portions of the one or more first events.

At step 509, the at least one processor may receive, using the image sensor, one or more second signals based on the reflections. For example, as explained above with respect to step 503, the at least one processor may receive the one or more second signals from image sensor 200 of FIG. 2A, image sensor 250 of FIG. 2B, or the like. In embodiments using a synchronous image sensor, the one or more second signals may have been captured in a different clock cycle. In embodiments using an asynchronous image sensor, the one or more second signals may have been captured at any time after the one or more first signals. In embodiments using an asynchronous image sensor, the readout may be clocked such that the at least one processor receives the one or more second signals in a different clock cycle than it received the one or more first signals.

At step 511, the at least one processor may detect one or more second events corresponding to one or more second pixels of the image sensor based on the received second signals. For example, as explained above with respect to step 505, the at least one processor may detect the one or more second events based on a polarity change between two signals of the one or more second signals, changes in amplitude between two signals of the one or more second signals having magnitudes greater than one or more thresholds, or the like. In embodiments using an event-based image sensor such as image sensor 250 of FIG. 2B, the one or more first signals may themselves encode the one or more second events.

At step 513, the at least one processor may determine candidates for connecting the one or more second events to the one or more first events. For example, as explained below with respect to FIG. 6, the candidates may be based on locations of the one or more second pixels with respect to the one or more first pixels. Additionally, or alternatively, any changes in amplitude, polarity, or the like different from those expected based on the plurality of patterns should be encapsulated in the candidates. In some embodiments, the at least one processor may use the plurality of patterns and the one or more state machines to determine the candidates.

As depicted in FIG. 5, method 500 may be recursive. For example, the at least one processor may repeat steps 509, 511, and 513 with each new set of signals from the image sensor (e.g., generated and/or received in the next clock cycle). Any change in the signals across pixels may then trigger a state machine search in step 513. This may repeat for a predetermined period of time or until one or more final events corresponding to ends of the plurality of patterns are detected.

At step 515, the at least one processor may determine three-dimensional image points for the one or more first pixels and the one or more second pixels based on the candidates and the one or more state machines. For example, if a pixel generated a series of signals whose events map to a pattern of the plurality of patterns (e.g., through a fully-known state machine), then the three-dimensional point may be determined using triangulation based on the location of the projector that transmitted the pattern and the location of the pixel that received the reflection therefrom. For example, as explained above, the pattern may encode one or more symbols indexed to the location of the projector that transmitted the pattern. The at least one processor may thus obtain the location of the projector that transmitted the pattern and extract the location of the pixel that received the reflection therefrom based on the address encoded in the signals from the image sensor.

If a pattern of the plurality of patterns caused reflections that spread across a plurality of pixels (e.g., due to dynamic motion in the scene), then the three-dimensional point at the final pixel (e.g., the pixel generating a final signal corresponding to and end of a pattern of the plurality of patterns) may be determined using triangulation based on the location of the projector that transmitted the pattern, the location of the final pixel, and the state machine to which the final pixel was linked based on the final signal received therefrom. The at least one processor may then proceed backwards (in time) from the final signal to finalize state machines for other pixels in the plurality of pixels receiving the reflections. For example, the image sensor may encode a timestamp on each measurement from pixels such that the at least one processor has past timestamps for previous pixels as well as timestamps for recent pixels. Thus, the three-dimensional points at these other pixels may be determined using triangulation based on the location of the projector that transmitted the pattern, the location of these other pixels, and the finalized state machines, and these points may be associated with the past timestamps.

Figure 6:
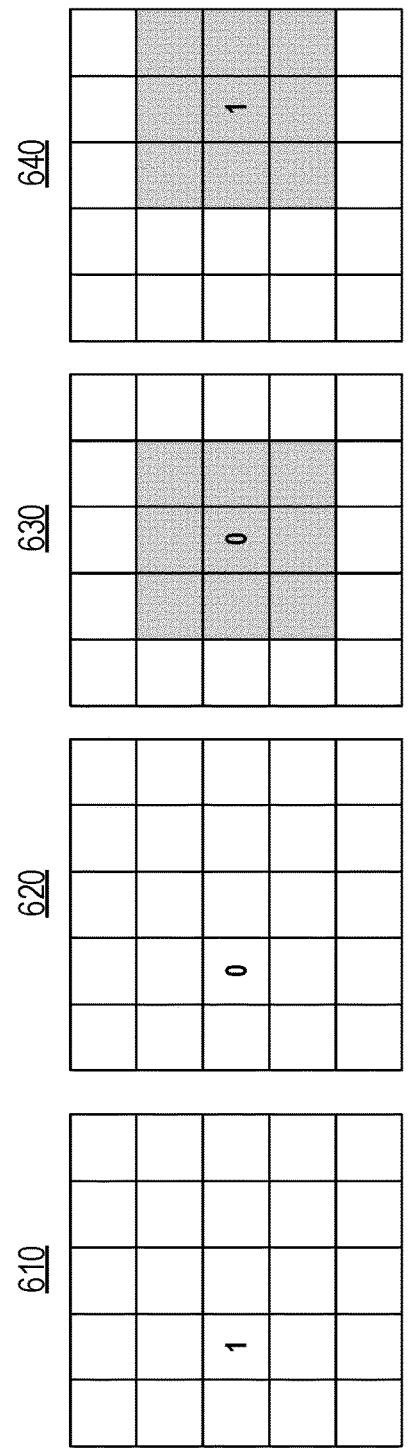
FIG. 6 is a graphical illustration of an exemplary state machine decoding, according to embodiments of the present disclosure.

As explained above, the projected patterns (e.g., from projector 301 of FIG. 3) may encode one or more symbols that are indexed to locations from which the patterns were projected. FIG. 6 is a diagram that illustrates a state machine search (e.g., based on step 507 and recursive execution of step 513 of FIG. 5) to allow for decoding of such symbols across a plurality of pixels. As depicted in FIG. 6, step 610 (which may, for example, correspond to step 507 of FIG. 5) may include initializing a state machine based on one or more initial events (e.g., depicted as encoding a "1" symbol in step 610) detected at a first pixel. The initial event(s) may be based on one or more signals received from the first pixel. One or more subsequent events (e.g., depicted as encoding a "0" symbol in step 620) may also be detected at the first pixel. These subsequent events link to the initial event(s) through a fully-known state machine (thus connected the "1" symbol and "0" symbol to form the beginning of a set of symbols indexed to a location from which the corresponding pattern was projected).

In cases of a dynamic scene, one or more subsequent events (e.g., depicted as encoding a "0" symbol in step 630) may be received at a different pixel than the first pixel, as would be expected from the state machine. Accordingly, as shown in FIG. 6, the at least one processor may search neighboring pixels (represented by the shaded area) to connect these subsequent events to previous event(s) (the events encoding the symbols depicted in steps 610 and 620 in the example of FIG. 6). Accordingly, the state machines of the previous event(s) may remain unfinished (e.g., the state machine remains at "1" followed by "0") and a new candidate state machine (describing "1" followed by "0" and then "0" again) added to the different pixel.

Similar to step 630, at step 640, one or more subsequent events (e.g., depicted as encoding a "1" symbol in step 640) may be received at a different pixel than in step 630, as would be expected from the state machine. Accordingly, as shown in FIG. 6, the at least one processor may again search neighboring pixels (represented by the shaded area) to connect these subsequent events to previous event(s) (the events encoding the symbol depicted in step 630 in the example of FIG. 6). Accordingly, the state machines of the previous event(s) may remain unfinished (e.g., the state machine remains at "1" followed by two "0"s) and a new candidate state machine (describing "1" followed by two "0"s followed by a "1") added to the different pixel.

When one or more events are detected corresponding to an end of one or more of the plurality of patterns (e.g., encoding a symbol that ends the sequence of symbols indexed to the location from which the corresponding pattern was projected), the at least one processor may complete the state machine for the current pixel and then proceed backwards in time to complete the state machines of pixels for the previous event(s).

Additionally, or alternatively to the decoding process of FIG. 6, embodiments of the present disclosure may use the incomplete state machines for triangulation as well as the finalized state machine. For example, each decoded symbol may be mapped, using a current state machine associated with that pixel, to the most likely pattern and use the location of the projector indexed to the most likely pattern for triangulation with the location of that pixel. Thus, even if the state machine is incomplete because the end of a pattern is not yet detected, triangulation may occur with varying degrees of accuracy depending on how many symbols have already been decoded (either at the current pixel or at one or more previous pixels). Additionally or alternatively, the at least one processor may assume that the pattern currently being decoded is the same pattern as that previously received at the same or a nearby pixel. For example, the at least one processor may perform this assumption when the projector transmits the same pattern repeatedly in succession towards the same location in the scene.

In some embodiments, one or more error corrections may be encoded in the symbols. For example, one or more additional symbols at the end of the pattern may comprise error correction symbols, such as a checksum (like a check bit, parity bit, or the like) or other block correction code. Additionally, or alternatively, one or more additional symbols may be added amongst the pattern to form a convolutional correction code or other continuous correction code. In addition with or in lieu of such error corrections, the projector may also be configured to project the patterns in a temporal loop such that the system excepts to receive the same patterns over and over. Accordingly, one lost pattern will result in one lost depth calculation but will not impact the overall series of three-dimensional images except for a single frame loss. Moreover, this lost frame may be recovered using extrapolation from neighboring frames.

Although depicted using "0" and "1," any number of symbols may be used based on a dictionary of symbols corresponding to characteristics of electromagnetic pulses (e.g., storing characteristics of pulses in association with particular symbols). Having a larger dictionary may allow for generating a set of unique patterns that are shorter in length.

Moreover, although described using a simple neighbor search, the state machine search may be conducted along an epipolar line or any other appropriate area of pixels for searching. For example, FIG. 7 depicts an example method 900 for connecting events detected using the image sensor, e.g., image sensor 200 of FIG. 2A, image sensor 250 of FIG. 2B, or the like, into a cluster.

Figure 7:
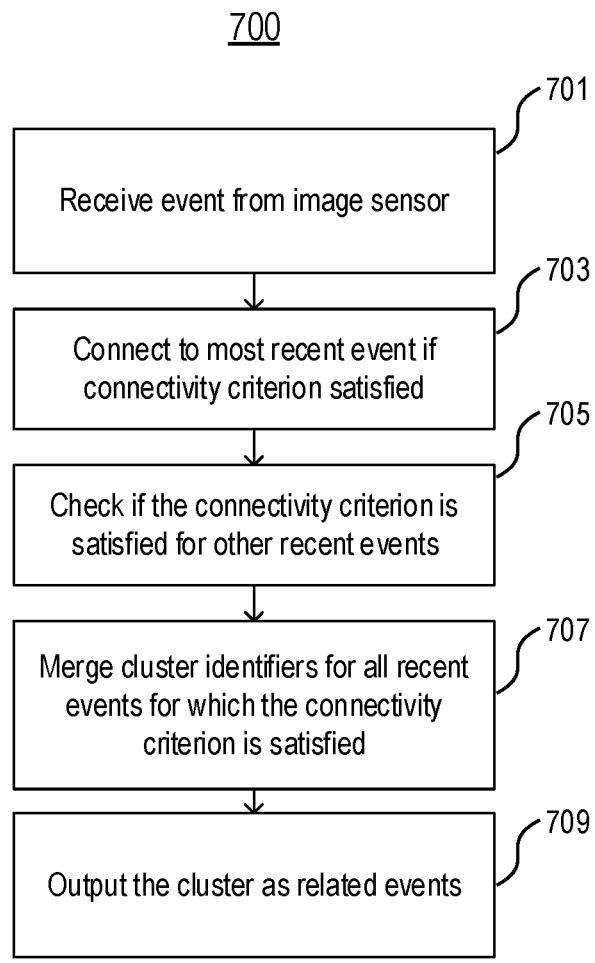
FIG. 7 is a flowchart of an exemplary method for connecting events from an image sensor into clusters, consistent with embodiments of the present disclosure.

FIG. 7 is a flowchart of an exemplary method 700 for connecting events from an image sensor into clusters, consistent with embodiments of the present disclosure. Method 700 of FIG. 7 may be performed using at least one processor, whether integrated as a microprocessor on the same chip as an image sensor (e.g., image sensor 200 of FIG. 2A, image sensor 250 of FIG. 2B, or the like) or provided separate as part of a processing system. The at least one processor may be in electrical communication with the image sensor for purposes of sending and receiving signals, as further disclosed herein.

At step 701, the at least one processor may receive an event from an image sensor (e.g., image sensor 200 of FIG. 2A, image sensor 250 of FIG. 2B, or the like). As described above with respect to step 505 of method 500, the event may comprise a signal from an event-based image sensor or an event extracted from signals of a continuous image sensor (e.g., using a clock circuit).

At step 703, the at least one processor may connect the received event to a most recent event if at least one connectivity criterion is met. For example, the at least one processor may determine a temporal distance between the received event and the most recent event and connect them if the temporal distance satisfies a threshold. Additionally, or alternatively, the at least one processor may determine a spatial distance between the received event and the most recent event and connect them if the spatial distance satisfies a threshold. Accordingly, the at least one connectivity criterion may comprise a temporal threshold, a spatial threshold, or any combination thereof. In one combinatory example, the spatial threshold may be adjusted based on which of a plurality of temporal thresholds are satisfied. In such an example, events closer in time may be expected to be closer in space. In another combinatory example, the temporal threshold may be adjusted based on which of a plurality of spatial thresholds are satisfied. In such an example, events closer in space may be expected to be closer in time.

At step 705, the at least one processor may determine whether the at least one connectivity criterion is satisfied for other recent events. For example, the at least one processor may use the at least one connectivity criterion to find all other recent events related to the received event At step 707, the at least one processor may merge cluster identifiers associated with all recent events for which the at least one connectivity criterion is satisfied. Accordingly, all recent events from steps 703 and 705 that satisfy the at least one connectivity criterion will be assigned the same cluster identifier as that of the event received at step 701.

At step 709, the at least one processor may output the cluster as a set of related events. For example, all events having the same cluster identifier may be output.

Exemplary embodiments of method 700 is described in European Patent Application No. 19154401.4, filed on Jan. 30, 2019, and titled "Method of Processing Information from an Event-Based Sensor." This disclosure of this application is incorporated herein by reference.

The cluster algorithm of method 700 may be used to perform the search of FIG. 6 rather than searching neighboring pixels. For example, the connectivity criteria of steps 703 and 705 may be used to identify which pixels should be searched. Moreover, any pixels already having the same cluster identifier may also be included in the search.

Additionally or alternatively, the cluster algorithm of method 700 may be used to cluster raw events received from the image sensor such that each cluster is then decoded and decoded symbols of that cluster are connected via state machines. Accordingly, rather than decoding each symbol and connecting the symbols sequentially, the decoding and connecting may be performed after clustering to reduce noise.

Figure 8:
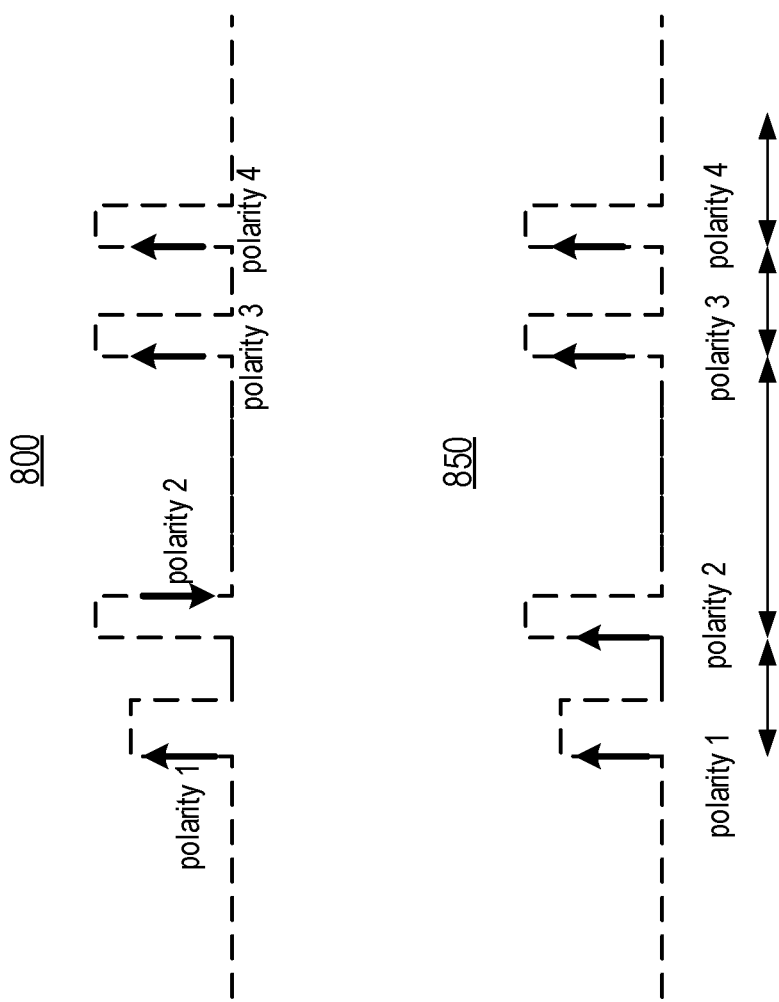
FIG. 8 is a graphical illustration of an exemplary symbol encoding using detected amplitude changes, according to embodiments of the present disclosure.

FIG. 8 is a diagram that illustrates two techniques for symbol encoding based on events detected from signals of an image sensor (e.g., image sensor 200 of FIG. 2A, image sensor 250 of FIG. 2B, or the like). As shown in example 800 of FIG. 8, detected events may comprise one or more changes in amplitude (having a particular polarity depending on whether the change is an increase or decrease) detected from signals of the image sensor. For example, brightness of light on image sensor 200 of FIG. 2A may be tracked across time and increases or decreases in amplitude detected therefrom. In another example, image sensor 250 of FIG. 2B is event-based and thus any signals therefrom may represent increases or decreases in amplitude that caused a trigger signal. Possible patterns may be decoded using the detected changes, allowing for identification of which pattern was received. Although not shown in example 800, the different changes may encode different symbols. For example, in example 800, polarities 1, 3, and 4 may encode a "1" symbol while polarity 2 encodes a "0" symbol. Thus, example 800 may be decoded as "1011."

In example 850 of FIG. 8, determined times between detected amplitude changes are determined and used for decoding. For example, brightness of light on image sensor 200 of FIG. 2A may be tracked across time and changes in amplitude detected therefrom. In another example, image sensor 250 of FIG. 2B is event-based and thus any signals therefrom may represent changes in amplitude that caused a trigger signal. Possible patterns may be decoded using temporal spaces between changes, allowing for identification of which pattern was received. Although not shown in example 850, the different temporal spaces may encode different symbols. For example, in example 850, the spaces between polarities 1 and 2, between polarities 3 and 4, and between polarity 4 and an end of pattern may encode a "1" symbol; on the other hand, the space between polarities 2 and 3 encodes a "0" symbol. Thus, example 850, similar to example 800, may be decoded as "1011."

Other techniques for matching (not depicted in FIG. 8) may include tracking of detected amplitudes of light at a plurality of times and identifying which pattern was received based thereon. For example, brightness of light on image sensor 200 of FIG. 2A may be tracked across time and changes in amplitude detected therefrom. In another example, image sensor 250 of FIG. 2B is event-based and thus any signals therefrom may represent changes in amplitude that caused a trigger signal. Possible patterns may be decoded using symbols corresponding to particular amplitudes and/or symbols corresponding to temporal lengths of particular amplitudes, allowing for identification of which pattern was received.

In another example, frequency of light on image sensor 200 of FIG. 2A may be tracked across time and changes in frequency detected therefrom. Possible patterns may be decoded using symbols corresponding to particular frequencies and/or symbols corresponding to temporal lengths of particular frequencies, allowing for identification of which pattern was received.

Although not depicted in FIG. 8, some detected events may be discarded. For example, at least one processor performing the three-dimensional imaging may discard any of the digital signals that are separated by an amount of time larger than a threshold and/or by an amount of time smaller than a threshold. By using a software or logic-based low bandpass filter and/or high bandpass filter, respectively, the system may further increase accuracy of pattern detection and decrease noise. The low bandpass filters and/or high bandpass filters may be implemented in software, or they may be implemented in firmware or hardware, e.g., by integration into measurement circuit 205 of FIG. 2A, exposure measurement circuit 257 of FIG. 2B, a readout system connected to the image sensor, or the like. For example, hardware implementation of a bandpass filter may include modifying analog settings of the sensor.

Similarly, the at least one processor performing the three-dimensional imaging may additionally or alternatively discard any of the digital signals associated with a bandwidth not within a predetermined threshold range. For example, a projector emitting the plurality of patterns onto the scene may be configured to project electromagnetic pulses within a particular frequency (and thus bandwidth) range. Accordingly, the system may use a bandwidth filter (in hardware and/or in software) to filter noise and only capture frequencies corresponding to those emitted by the projector. Additionally, or alternatively, the system may use a bandwidth filter (in hardware and/or in software) to filter high-frequency and/or low-frequency light in order to reduce noise.

In additional to or in lieu of the software and/or hardware bandpass and/or frequency filters described above, the system may include one more optical filters used to filter light from the scene impinging on the image sensor. For example, with respect to FIGS. 2A and 2B, the optical filter(s) may be configured to block any reflections associated with a wavelength not within a predetermined range.

In some embodiments, rather than using single events as depicted in example 800 or timings between single events as depicted in example 850, embodiments of the present disclosure may encode symbols using event bursts. For example, FIG. 9 depicts an example method 900 for detecting event bursts using the image sensor, e.g., image sensor 200 of FIG. 2A, image sensor 250 of FIG. 2B, or the like.

Figure 9:
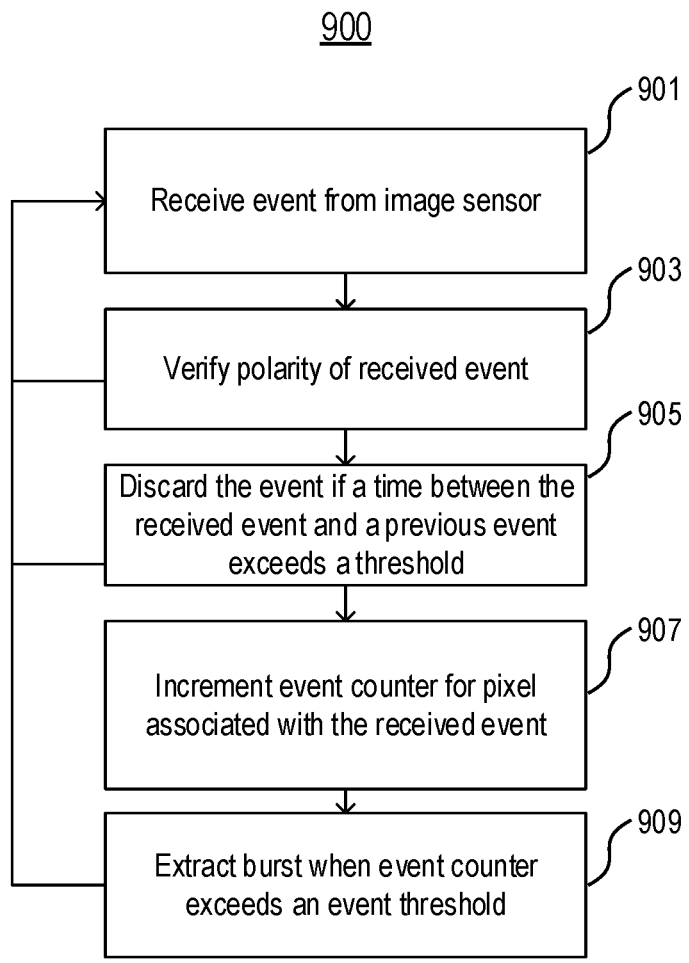
FIG. 9 is a flowchart of an exemplary method for detecting event bursts, consistent with embodiments of the present disclosure.

FIG. 9 is a flowchart of an exemplary method 900 for detecting event bursts, consistent with embodiments of the present disclosure. Method 900 of FIG. 9 may be performed using at least one processor, whether integrated as a microprocessor on the same chip as an image sensor (e.g., image sensor 200 of FIG. 2A, image sensor 250 of FIG. 2B, or the like) or provided separate as part of a processing system. The at least one processor may be in electrical communication with the image sensor for purposes of sending and receiving signals, as further disclosed herein.

FIG. 9 is a flowchart of an exemplary method 900 for detecting event bursts, consistent with embodiments of the present disclosure. Method 900 of FIG. 9 may be performed using at least one processor, whether integrated as a microprocessor on the same chip as an image sensor (e.g., image sensor 200 of FIG. 2A, image sensor 250 of FIG. 2B, or the like) or provided separate as part of a processing system. The at least one processor may be in electrical communication with the image sensor for purposes of sending and receiving signals, as further disclosed herein.

At step 901, the at least one processor may receive an event from an image sensor (e.g., image sensor 200 of FIG. 2A, image sensor 250 of FIG. 2B, or the like). As described above with respect to step 505 of method 500, the event may comprise a signal from an event-based image sensor or an event extracted from signals of a continuous image sensor (e.g., using a clock circuit).

At step 903, the at least one processor may verify the polarity of the event. For example, the at least one processor may determine whether the polarity matches a polarity expected for the event, whether the same as a previous event if a plurality of increases or decreases are expected or different than the previous event if a polarity change is expected. For example, the projected patterns may be configured to always generate a plurality (such as 2, 3, or the like) of events in order to signal an increasing signal or a decreasing signal. Such a plurality may allow for filtering of noise at step 903. If the polarity is not valid, the at least one processor may discard the event and start over at step 901 with a new event, as depicted in FIG. 9. Additionally, or alternatively, if the polarity is not valid, the at least one processor may discard a current burst and use the event from step 901 as the beginning of a new potential burst.

At step 905, the at least one processor may discard the received event if too remote in time from a previous event (e.g., if a difference in time exceeds a threshold). Accordingly, the at least one processor may avoid connecting events too remote in time to form part of a single burst. If the event is too remote, the at least one processor may discard the event and start over at step 901 with a new event, as depicted in FIG. 9. Additionally, or alternatively, if the event is too remote, the at least one processor may discard a current burst and use the event from step 901 as the beginning of a new potential burst.

At step 907, the at least one processor may increment an event counter of an associated pixel. For example, the associated pixel may comprise the pixel from which the event of step 901 was received. The event counter may comprise an integer counting events received at recursive executions of step 901 that qualify, under steps 903 and 905, as within the same burst.

At step 909, the at least one processor may extract a burst when the event counter exceeds an event threshold. For example, the event threshold may comprise between 2 and 10 events. In other embodiments, a greater event threshold may be used. If the burst is extracted, the at least one processor may reset the event counter. If the event counter does not exceed the event threshold, the at least one processor may return to step 901 without resetting the event counter. Accordingly, additional events that qualify, under steps 903 and 905, as within the same burst may be detected and added to the event counter at step 907.

In some embodiments, method 900 may further include discarding the received event if too remote in time from a first event of a current burst. Accordingly, method 900 may prevent noise from causing a burst to be inadvertently extended beyond a threshold.

Additionally, or alternatively, method 900 may track a number of events by region such that bursts are detected only within regions rather than across a single pixel or the whole image sensor. Accordingly, method 900 may allow for detection of concurrent bursts on different portions of an image sensor.

Whenever an event is discarded, the at least one processor may reset the event counter. Alternatively, in some embodiments, the at least one processor may store the corresponding event counter even when an event is discarded. Some embodiments may use a combination of saving and discarding. For example, the event counter may be saved if an event is discarded at step 903 but may be reset if an event is discarded at step 905.

A detailed description of exemplary embodiments of method 900 is described in International Patent Application No. TBD, filed on Jan. 30, 2019, and titled "Method and Apparatus of Processing a Signal from an Event-Based Sensor." The disclosure of this application is incorporated herein by reference.

Extracted bursts from method 900 may comprise a symbol (e.g., used as part of an encoded pattern). For example, by using a burst to encode a symbol rather than a single event, the system may increase accuracy and reduce noise. Additionally, or alternatively, extracted bursts from method 900 may comprise a set of symbols forming the encoded pattern. For example, by using a burst to encode the pattern, the system may distinguish between distinct patterns in time with greater accuracy and reduced noise.

Although described using the architectures of FIG. 2A or 2B, any image sensor adapted to capturing signals based on brightness of light impinging on one or more photosensitive elements (e.g., photodiodes) may be used. Accordingly, any combination of transistors, capacitors, switches, and/or other circuit components arranged to perform such capture may be used in the systems of the present disclosure. Moreover, the systems of the present disclosure may use any synchronous image sensors (such as image sensor 200 of FIG. 2A) or any event-based image sensors (such as image sensor 250 of FIG. 2B).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

In addition to the above-referenced patents and applications, the entirety of each of the following applications are hereby incorporated by reference herein: U.S. Application No. 62/809,557, filed Feb. 22, 2019, titled Systems and Methods for Three-Dimensional Imaging and Sensing; and U.S. Application No. 62/810,926, filed Feb. 26, 2019, titled Systems and Methods for Three-Dimensional Imaging and Sensing.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. A system for detecting three-dimensional images, comprising:
   a projector configured to project a plurality of patterns of electromagnetic pulses onto a scene, each pattern indexed to spatial coordinates of the projector; and
   an image sensor comprising a plurality of pixels and configured to detect reflections of the patterns from the scene caused by the projected plurality of patterns of electromagnetic pulses, and index the detected reflected patterns by spatial coordinates of the pixels detecting the reflected patterns, the system further comprising:
   at least one processor configured to:
   determine a plurality of patterns associated with the plurality of patterns of electromagnetic pulses,
   receive one or more first signals from the image sensor based on the detected reflected patterns,
   detect one or more first events corresponding to one or more first pixels of the image sensor based on the received first signals,
   based on the one or more first events, initialize one or more state machines configured for tracking reflected patterns that move across the pixels of the image sensor,
   receive one or more second signals from the image sensor based on the detected reflected patterns, detect one or more second events corresponding to one or more second pixels of the image sensor based on the received second signals,
determine candidates for connecting the one or more second events to the one or more first events, and
determine three-dimensional image points for the one or more first pixels and the one or more second pixels based on the candidates and the one or more state machines.

2. The system of claim 1, wherein the one or more first events correspond to a start of the plurality of patterns associated with the plurality of patterns of electromagnetic pulses.

3. The system of claim 2, wherein the one or more second events correspond to an end of the plurality of patterns associated with the plurality of patterns of electromagnetic pulses.

4. The system of claim 1, wherein the plurality of patterns comprise at least two different amplitudes separated in time;
at least two different wavelengths separated in time;
at least two different pulse lengths separated by a length of time; or
a plurality of pulses separated by different lengths of time.

5. The system of claim 1, wherein the plurality of patterns comprise pulses having at least one of selected frequencies, phase shifts, or duty cycles used to encode symbols.

6. The system of claim 1, wherein the projector is further configured to project the plurality of patterns of electromagnetic pulses to a plurality of spatial locations in the scene.

7. The system of claim 6, wherein at least one of the spatial locations corresponds to at least one of the one or more first pixels, and at least one other of the spatial locations corresponds to at least one of the one or more second pixels.

8. The system of claim 1, wherein the projector is further configured to project the plurality of patterns of electromagnetic pulses at a plurality of different projection times.

9. The system of claim 8, wherein at least one of the projection times corresponds to at least one of the one or more first events, and at least one other of the projection times corresponds to at least one of the one or more second events.

10. The system of claim 1, wherein each pixel of the image sensor comprises:
a detector electrically connected to at least one first photosensitive element and configured to generate a trigger signal when an analog signal proportional to brightness of light impinging on the at least one first photosensitive element matches a condition, and
at least one second photosensitive element configured to output a signal that is a function of brightness of light impinging on the at least one second photosensitive element in response to the trigger signal.

11. The system of claim 10, wherein the at least one first photosensitive element comprises the at least one second photosensitive element.

12. The system of claim 11, wherein:
the one or more first signals have positive polarity when the condition is an increasing condition and negative polarity when the condition is a decreasing condition; and
the at least one processor is further configured to perform at least one of:
decoding polarities of the one or more first signals to obtain the one or more first events, or
discarding any of the one or more first signals separated by an amount of time larger than a threshold or associated with a bandwidth not within a predetermined range.

13. The system of claim 1, further comprising an optical filter configured to block any reflections associated with a wavelength not within a predetermined range.

14. The system of claim 1, wherein the plurality of patterns comprises:
a set of unique symbols encoded in electromagnetic pulses;
a set of quasi-unique symbols encoded in electromagnetic pulses; or
a set of quasi-unique symbols encoded in electromagnetic pulses, wherein the symbols are unique within a geometrically defined space.

15. The system of claim 14, wherein the geometrically defined space comprises an epipolar line of the system.

16. The system of claim 1, wherein the at least one processor is further configured to store finalized state machines comprising the one or more initialized state machines and the candidates.

17. The system of claim 16, wherein the at least one processor is further configured to use the stored state machines in determining candidates for subsequent events.

18. The system of claim 1, wherein the at least one processor is further configured to use the plurality of patterns and the one or more state machines to determine candidates for connecting the one or more second events to the one or more first events.

19. The system of claim 1, wherein the at least one processor is further configured to determine the three-dimensional image points based on spatial coordinates of the projector and first and second pixels of the image sensor detecting the reflected patterns.

20. The system of claim 1, wherein the at least one processor is further configured to determine the three-dimensional image by performing a triangulation based on a location of the pixel of the image sensor that received the reflected pattern or a location of a final pixel of the image sensor that received the reflected pattern and the state machine to which the final pixel is linked.

21. An imaging system, comprising:
a plurality of pixels, each pixel comprising a first photosensitive element; and
a system for detecting three-dimensional images, the system further comprising:
a projector configured to project a plurality of patterns of electromagnetic pulses onto a scene, each pattern indexed to spatial coordinates of the projector;
an image sensor comprising a plurality of pixels and configured to detect reflections of the patterns from the scene caused by the projected plurality of patterns of electromagnetic pulses, and index the detected reflected patterns by spatial coordinates of the pixels detecting the reflected patterns; and
at least one processor configured to:
determine a plurality of patterns associated with the plurality of patterns of electromagnetic pulses,
receive one or more first signals from the image sensor based on the detected reflected patterns,
detect one or more first events corresponding to one or more first pixels of the image sensor based on the received first signals, based on the one or more first events, initialize one or more state machines configured for tracking reflected patterns that move across the pixels of the image sensor, receive one or more second signals from the image sensor based on the detected reflected patterns, detect one or more second events corresponding to one or more second pixels of the image sensor based on the received second signals, determine candidates for connecting the one or more second events to the one or more first events, and determine three-dimensional image points for the one or more first pixels and the one or more second pixels based on the candidates and the one or more state machines.

22. The imaging system of claim 21, wherein the at least one processor is further configured to determine the three-dimensional image points based on spatial coordinates of the projector and first and second pixels of the image sensor detecting the reflected patterns.

23. The imaging system of claim 21, wherein the at least one processor is further configured to determine the three-dimensional image points by performing a triangulation based on a location of the pixel of the image sensor that received the reflected pattern or a location of a final pixel of the image sensor that received the reflected pattern and the state machine to which the final pixel is linked.

24. A method for detecting three-dimensional images, comprising:

determining a plurality of patterns corresponding to a plurality of patterns of electromagnetic pulses projected by a projector onto a scene;

receiving, from an image sensor comprising a plurality of pixels, one or more first signals based on reflections of the patterns from the scene caused by the projected plurality of patterns of electromagnetic pulses;

detecting one or more first events corresponding to one or more first pixels of the image sensor based on the received first signals;

based on the one or more first events, initializing one or more state machines configured for tracking reflected patterns that move across the pixels of the image sensor;

receiving, from the image sensor, one or more second signals based on the reflections;

detecting one or more second events corresponding to one or more second pixels of the image sensor based on the received second signals;

determining candidates for connecting the one or more second events to the one or more first events; and determining three-dimensional image points for the one or more first pixels and the one or more second pixels based on the candidates and the one or more state machines.

25. The method of claim 24, wherein the determining the three-dimensional image points further comprises determining the three dimensional image points based on spatial coordinates of the projector and first and second pixels of the image sensor detecting the reflected patterns.

26. The method of claim 24, wherein the determining the three-dimensional image points includes performing a triangulation based on a location of the pixel of the image sensor that received the reflected pattern or a location of a final pixel of the image sensor that received the reflected pattern and the state machine to which the final pixel is linked.

* * * * *

UNITED STATES PATENT AND TRADEMARK OFFICE
CERTIFICATE OF CORRECTION

| | |
|---|---|
| PATENT NO. | : 12,000,692 B2 |
| APPLICATION NO. | : 17/310753 |
| DATED | : June 4, 2024 |
| INVENTOR(S) | : Guillaume Chican et al. |

Page 1 of 1

It is certified that error appears in the above-identified patent and that said Letters Patent is hereby corrected as shown below:

On the Title Page

Column 2,
Abstract, Line 14, "more first events more state" should read as --more state--.
Abstract, Lines 19-20, "more state machines more second" should read as --more second--.

Signed and Sealed this
Thirtieth Day of July, 2024

Katherine Kelly Vidal
*Director of the United States Patent and Trademark Office*